(12) United States Patent
Damnjanovic et al.

(10) Patent No.: US 10,541,772 B2
(45) Date of Patent: Jan. 21, 2020

(54) TECHNIQUES FOR TRANSMISSION OF DISCOVERY REFERENCE SIGNALS IN NEW RADIO SHARED SPECTRUM

(71) Applicant: QUALCOMM Incorporated, San Diego, CA (US)

(72) Inventors: Aleksandar Damnjanovic, Del Mar, CA (US); Tao Luo, San Diego, CA (US); Andrei Dragos Radulescu, San Diego, CA (US); Srinivas Yerramalli, San Diego, CA (US); Rahul Malik, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/942,088

(22) Filed: Mar. 30, 2018

(65) Prior Publication Data

US 2018/0316454 A1     Nov. 1, 2018

Related U.S. Application Data

(60) Provisional application No. 62/491,786, filed on Apr. 28, 2017.

(51) Int. Cl.
*H04W 48/10* (2009.01)
*H04J 11/00* (2006.01)
*H04W 16/14* (2009.01)
*H04L 5/00* (2006.01)
*H04W 56/00* (2009.01)

(52) U.S. Cl.
CPC ........ *H04J 11/0086* (2013.01); *H04L 5/0048* (2013.01); *H04W 16/14* (2013.01); *H04W 48/10* (2013.01); *H04W 56/002* (2013.01)

(58) Field of Classification Search
CPC .... H04L 5/0048; H04W 16/14; H04W 48/10; H04W 56/002
See application file for complete search history.

(56) References Cited

U.S. PATENT DOCUMENTS

| 2003/0063711 | A1* | 4/2003 | Ginesi | H04L 12/66 |
| | | | | 379/1.01 |
| 2011/0256655 | A1* | 10/2011 | Nikzad | H01L 27/14643 |
| | | | | 438/60 |
| 2011/0261759 | A1* | 10/2011 | Yamada | H04W 72/0453 |
| | | | | 370/328 |

(Continued)

FOREIGN PATENT DOCUMENTS

| WO | WO-2016183941 A1 | 11/2016 |
| WO | WO-2017026980 A1 | 2/2017 |
| WO | WO-2017063779 A1 | 4/2017 |

*Primary Examiner* — Mewale A Ambaye
(74) *Attorney, Agent, or Firm* — Arent Fox, LLP

(57) ABSTRACT

Various aspects described herein relate to techniques for synchronization signal transmissions in wireless communications (e.g., 5th Generation New Radio). In an aspect, a method includes detecting that a medium in a shared spectrum is busy, and delaying a transmission of a synchronization signal (SS) block in the shared spectrum in response to detecting that the medium is busy. The method further includes detecting that the previously busy medium is free, and transmitting, in response to detecting that the medium is free, a filler signal before transmitting the SS block in the shared spectrum, and the SS block includes one or more discovery reference signals (DRSs).

28 Claims, 7 Drawing Sheets

(56) References Cited

U.S. PATENT DOCUMENTS

| | | |
|---|---|---|
| 2017/0019924 A1 | 1/2017 | Wang et al. |
| 2017/0069332 A1* | 3/2017 | Disch .................... G10L 19/028 |
| 2017/0251456 A1 | 8/2017 | Radulescu et al. |
| 2018/0048413 A1* | 2/2018 | Liu ....................... H04J 11/0069 |
| 2018/0241602 A1* | 8/2018 | Bhorkar .................. H04L 5/001 |
| 2018/0302842 A1* | 10/2018 | Sugirtharaj ........... H04L 5/0048 |

* cited by examiner

TECHNIQUES FOR TRANSMISSION OF DISCOVERY REFERENCE SIGNALS IN NEW RADIO SHARED SPECTRUM

CROSS-REFERENCE TO RELATED APPLICATION

This application claims the benefit of U.S. Provisional Application Ser. No. 62/491,786, entitled "TRANSMISSION OF DISCOVERY REFERENCE SIGNALS IN NEW RADIO SHARED SPECTRUM" and filed on Apr. 28, 2017, which is expressly incorporated by reference herein in its entirety.

BACKGROUND

The present disclosure relates generally to wireless communications systems, and more particularly, to techniques for discovery reference signal (DRS) transmissions in wireless communications (e.g., 5th Generation New Radio).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, and lower latency, new approaches may be desirable to improve the system reliability and energy efficiency by using enhanced synchronization signal (e.g., DRS) transmission schemes and techniques, in order to enhance medium access, satisfy consumer demand, and improve user experience in wireless communications, e.g., 5G NR communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method related to synchronization signal (e.g., DRS) transmission (e.g., performed by a base station) is provided as part of this disclosure. According to one example, the method may include detecting that a medium in a shared spectrum is busy, and delaying a transmission of a synchronization signal (SS) block in the shared spectrum in response to detecting that the medium is busy. The method may further include detecting that the previously busy medium is free, and transmitting, in response to detecting that the medium is free, a filler signal before transmitting the SS block in the shared spectrum, and the SS block may include one or more discovery reference signals (DRSs).

In another aspect, an apparatus for wireless communications is provided that includes a transmitter, a memory configured to store instructions, and one or more processors communicatively coupled with the transmitter and the memory. For example, the one or more processors may be configured to execute the instructions to detect that a medium in a shared spectrum is busy, delay a transmission of an SS block in the shared spectrum in response to detecting that the medium is busy, detect that the previously busy medium is free, and transmit, via the transmitter and in response to detecting that the medium is free, a filler signal before transmitting the SS block in the shared spectrum, and the SS block may include one or more DRSs.

In yet another aspect, an apparatus for wireless communications is provided that includes means for detecting that a medium in a shared spectrum is busy, and means for delaying a transmission of an SS block in the shared spectrum in response to detecting that the medium is busy. The apparatus further include means for detecting that the previously busy medium is free, and means for transmitting, in response to detecting that the medium is free, a filler signal before transmitting the SS block in the shared spectrum, and the SS block may include one or more DRSs.

In a further aspect, a computer-readable medium (e.g., a non-transitory computer-readable storage medium) is provided storing code executable by at least one processor and comprising code to detect that a medium in a shared spectrum is busy, delay a transmission of an SS block in the shared spectrum in response to detecting that the medium is busy, detect that the previously busy medium is free, and transmit, in response to detecting that the medium is free, a filler signal before transmitting the SS block in the shared spectrum, and the SS block may include one or more DRSs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

Figure 1A:
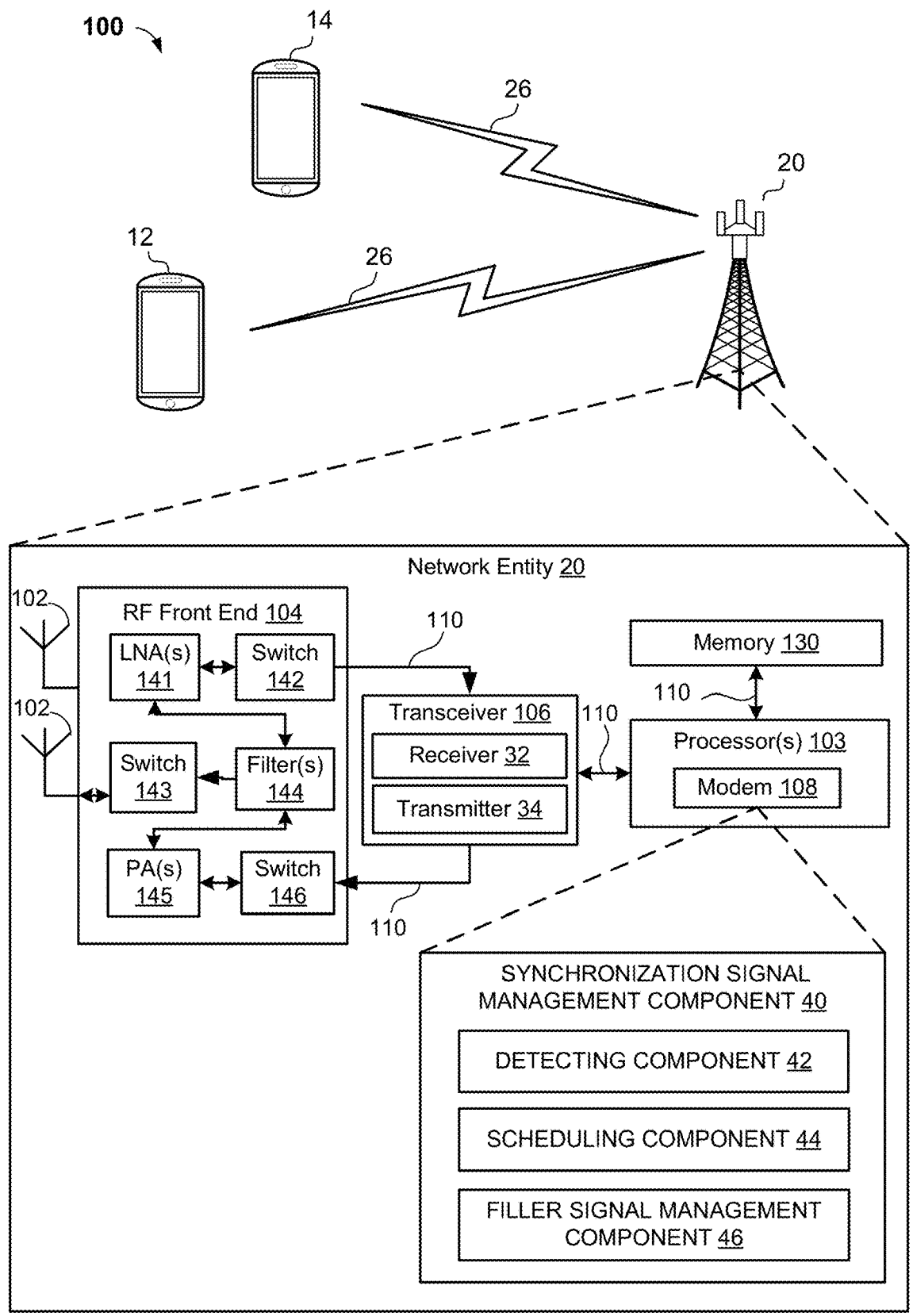
FIG. 1A is a diagram illustrating an example of a wireless communications system (e.g., a 5G NR system) including a network entity configured to transmit one or more synchronization signals (SSs) to one or more user equipments (UEs), in accordance with various aspects of the present disclosure.

In a wireless communications system (e.g., a 5G NR system), synchronization signals (SSs) may be used and transmitted (e.g., by a base station or a gNB) in a licensed spectrum, an unlicensed spectrum, and/or a shared spectrum. In some instances, the terms unlicensed spectrum and shared spectrum may be used interchangeably. Discovery reference signals (DRSs), a type of SS, may be included and transmitted in a SS block. In an aspect, DRS transmissions may be limited to a transmission window (e.g., a discovery measurement timing configuration (DMTC) window). In some aspects, configuration of a DMTC window is provided by the network (e.g., a next generation NodeB or gNB) to a user equipment (UE), and the DMTC may enable power savings at the UE. In an aspect of a 5G NR system, a gNB may perform a clear channel assessment (CCA) and/or an extended CCA (ECCA) before attempting transmissions of DRS within a DMTC window (e.g., one or more SS blocks). As such, enhanced DRS transmission schemes and techniques may be desirable to improve the system reliability for SS and/or DRS transmissions/receptions, and to enhance system energy efficiency by configuring DRS and/or SS transmission timing to accommodate new SS structure(s), e.g., for shared or unlicensed spectrum in 5G NR.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In some implementations of a wireless communication system, upon power up, a UE may perform frequency scanning and/or an initial cell search on one or more selected frequencies. In an aspect, the duration of a cell search (e.g., the initial cell search) on each carrier frequency may be determined by the periodicity of the transmission of a discovery signal (e.g., a DRS). In some cases, upon detecting a DRS transmission from a base station (e.g., a gNB), the UE may determine if the detected cell is suitable for wireless communications. In an example, the UE may rely on the minimal amount of system information (SI) to determine whether the detected cell is suitable for wireless communications.

In some aspects, one or more DRS transmissions may be configured by DMTC, and the one or more DRS transmissions may be limited to a transmission window (e.g., a DMTC window). In an implementation, the configuration of the DMTC window is provided by the network (e.g., a base station, an eNB, or a gNB). For example, the DMTC and/or the configuration of the DMTC window may be included in the SI, and transmitted from the network to the UE. In an aspect, the UE may only wake up during the DMTC window. Therefore, the DMTC may enable power savings at the UE, and the power savings may be feasible after the SI is obtained or received by the UE for one or more particular carrier frequencies.

In an aspect, a base station (e.g., a gNB in a 5G NR system) may perform a single Clear Channel Assessment (CCA) before attempting transmission of one or more SSs (e.g., DRSs) within a DMTC window. In another aspect, the base station may perform multiple CCAs before attempting transmissions of one or more SSs (e.g., DRSs) within a DMTC window. In some examples, one or more CCAs may be required when the base station is not already transmitting on a certain data channel.

In some examples, transmission of one or more SSs (e.g., DRSs) may accompany with a Physical Broadcast Channel (PBCH) transmission. In an aspect, one or more SSs (e.g., DRSs) and/or a PBCH may not span the entire system bandwidth. In some cases, a Master Information Block (MIB) may be used by or mapped to a PBCH for the SS block/slot transmissions discussed herein.

In some aspects, one or more SSs (e.g., DRSs) and/or a PBCH may be transmitted after the medium is detected or determined to be free, e.g., after one or more successful CCAs. For example, a DRS or a PBCH transmission may begin after a successful CCA operation. In an example, a base station may start to transmit one or more SSs (e.g., DRSs) and/or a PBCH immediately upon a successful CCA. In some cases, the associated PBCH transmission may include an offset from the start of an orthogonal frequency division multiplexing (OFDM) symbol, a subframe, and/or start of a DMTC window as if an initial or a previous CCA was successful (e.g., no offset because of the medium being free). In another example, after the base station detects or determines that the medium is free (e.g., upon a successful CCA), the base station may start to transmit a filler signal until a boundary (e.g., a boundary that would be applied or observed as if a previously busy medium was free), and then transmit the one or more SSs (e.g., DRSs) and/or the PBCH after the filler signal. In an example, a base station may start to transmit the filler signal immediately upon a successful CCA or ECCA. In some cases, the SS (e.g., DRS) or PBCH transmissions may be aligned with a transmission time interval (TTI) by filling a signal (e.g., the filler signal), so the timing of the SS or PBCH transmissions may be aligned with the start of a TTI or the end of a TTI. In some examples, the time duration of the filler signal and/or when a waveform (e.g., a 5G NR signal including one or more SSs and/or PBCHs) transmission begins may vary as discussed herein (e.g., in FIG. 3A, 3B, or 3C).

In some examples, the filler signal may be a noise signal or a blank signal without any control information or data, and the filler signal may be used to occupy the medium. For example, the filler signal may be a Gaussian noise signal or another type of noise signal. In some aspects, the boundary may be an OFDM symbol boundary, an SS or DRS boundary, or a subframe boundary. In some examples, the associated PBCH transmission may include an offset from the start of a subframe that would be transmitted as if the previously busy medium was free, and/or start of a DMTC window that would be used as if the previously busy medium was free.

In some implementations (e.g., in an LTE system or a 5G NR system), for example, in time domain, a subframe discussed herein may be 1 ms in length. In an example of a conventional communications system (e.g., an LTE system), a subframe (e.g., 1 ms in length with two (2) slots) may include fourteen (14) OFDM symbols. In an example of a 5G NR system, because the 5G NR tone spacing may be twice as large as the tone spacing used for a conventional communications system (e.g., an LTE system), a subframe may include twenty-eight (28) OFDM symbols (e.g., 14 OFDM symbols×2 slots=28 OFDM symbols). Hence, the time duration of each OFDM symbol in a 5G NR subframe may be half of the time duration of each OFDM symbol in a subframe that used for, e.g., an LTE system. In an aspect, for example, the tone spacing used in an LTE system is fixed at 15 kHz. In contrast, for example, a 5G NR system may have different tone spacing, which may be represented by 15 kHz×$2^n$, where n=1, 2, 3, 4.

In some examples, the one or more SSs (e.g., DRSs) and/or the PBCH may be transmitted in a licensed spectrum, an unlicensed spectrum, and/or a shared spectrum. In an aspect, transmission of one or more SSs (e.g., DRSs) and/or a PBCH in an unlicensed spectrum and/or a shared spectrum may not be periodic.

Figure 1B:
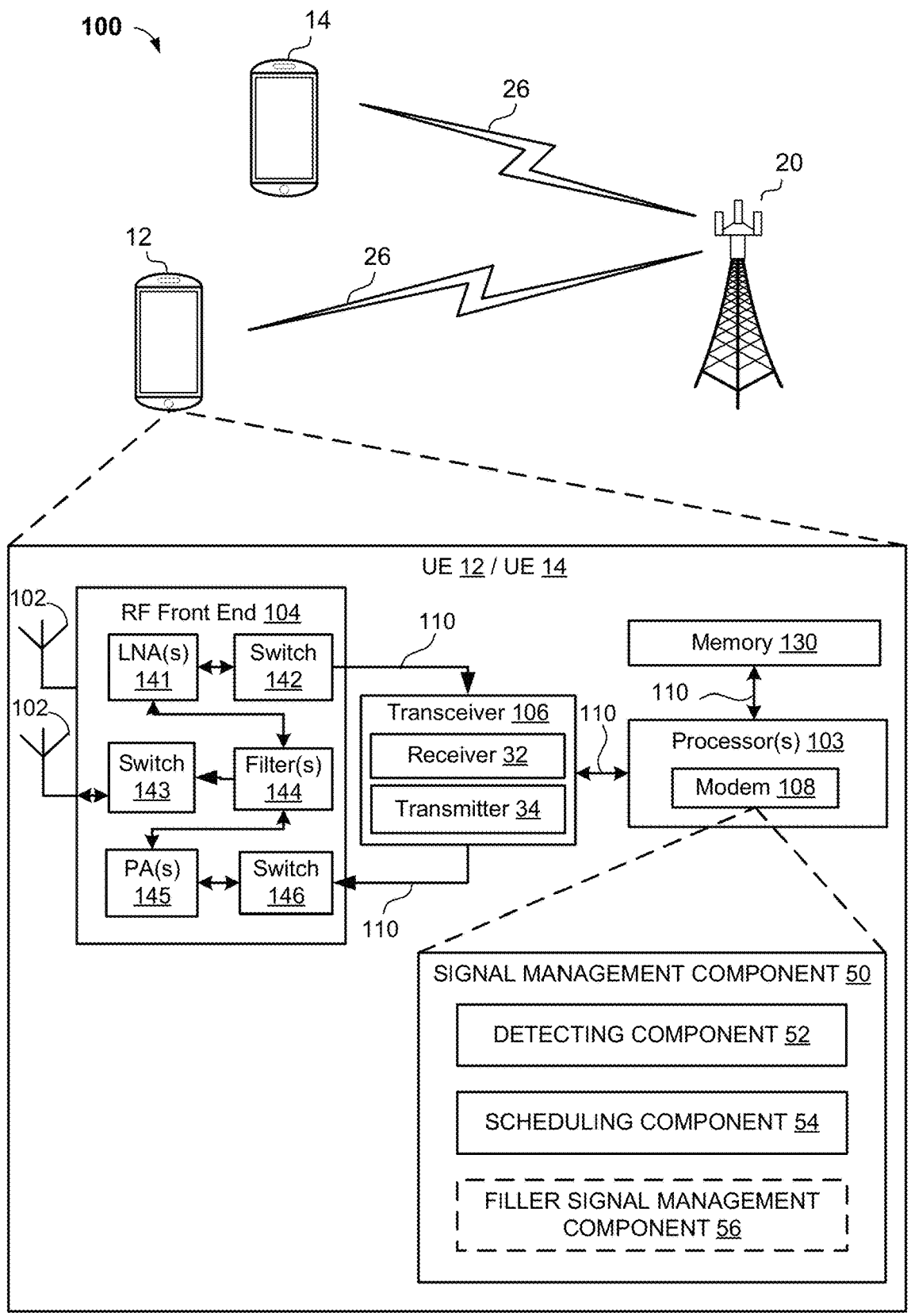
FIG. 1B is a diagram illustrating an example of a wireless communications system (e.g., a 5G NR system) including one or more user equipments and (UEs) configured to receive one or more SSs, in accordance with various aspects of the present disclosure.

Referring to FIG. 1A and FIG. 1B, in an aspect, a wireless communication system 100 (e.g., a 5G NR system) includes at least a UE 12 or a UE 14 in communication coverage of at least one network entity 20 (e.g., a base station or a gNB, or a cell thereof, in a 5G NR network). UE 12 and/or UE 14 may communicate with a network via the network entity 20. In some aspects, multiple UEs including UE 12 and/or UE 14 may be in communication coverage with one or more network entities, including network entity 20. In an aspect, the network entity 20 may be a base station such a gNB in a 5G NR network, and/or an eNodeB/eNB in an LTE network. Although various aspects are described in relation to the Universal Mobile Telecommunications System (UMTS), LTE, or 5G NR networks, similar principles may be applied in other wireless wide area networks (WWAN). The wireless network may employ a scheme where multiple base stations may transmit on a channel. In an example, UE 12 and/or UE 14 may transmit and/or receive wireless communications to and/or from network entity 20. For example, the UE 12 and/or UE 14 may be actively communicating with network entity 20.

In some aspects, UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, network entity 20 may be a macrocell, picocell, femtocell, relay, Node B, mobile Node B, gNB, small cell box, UE (e.g., communicating in peer-to-peer or ad-hoc mode with UE 12 and/or UE 14), or substantially any type of component that can communicate with UE 12 and/or UE 14 to provide wireless network access at the UE 12 and/or UE 14.

Referring to FIG. 1A, according to the present aspects, the network entity 20 may include one or more processors 103 and a memory 130 that may operate in combination with a synchronization signal management component 40 to control a detecting component 42, a scheduling component 44, and/or a filler signal management component 46, for performing SS (e.g., DRS) transmissions, management, and related operations as described herein.

In some aspects, the synchronization signal management component 40 and/or at least one subcomponent of the synchronization signal management component 40 may perform SS detection, scheduling, transmissions and related operations. For example, the detecting component 42 may be configured to detect whether a medium in a shared spectrum is busy or free. In an aspect, the scheduling component 44 may be configured to delay a transmission of one or more SSs (e.g., DRSs or PBCHs) in a shared spectrum. In some examples, the filler signal management component 46 may be configured to transmit a filler signal before transmitting one or more SSs (e.g., DRSs, or PBCH) in the shared spectrum.

In an aspect, the term "component" as used herein may be one of the parts that make up a system, may be hardware, firmware, and/or software, and may be divided into other components. The synchronization signal management component 40 may be communicatively coupled with a transceiver 106, which may include a receiver 32 for receiving and processing radio frequency (RF) signals and a transmitter 34 for processing and transmitting RF signals (e.g., SS, DRS, or PBCH transmissions). The synchronization signal management component 40 may include the detecting component 42, the scheduling component 44, and/or the filler signal management component 46, for performing SS management and operations. The processor 103 may be coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, an RF receiver. In an aspect, the receiver 32 may receive signals transmitted by UE 12 and/or UE 14. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, an RF transmitter.

In an aspect, the one or more processors 103 may include a modem 108 that uses one or more modem processors. The various functions related to the synchronization signal management component 40 may be included in modem 108 and/or processors 103 and, in an aspect, may be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the synchronization signal management component 40, including the detecting component 42, the scheduling component 44, and/or the filler signal management component 46.

The synchronization signal management component 40, the detecting component 42, the scheduling component 44, and/or the filler signal management component 46, may include hardware, firmware, and/or software code executable by a processor for performing detecting, scheduling, transmissions and related SS operations. For example, the hardware may include, for example, a hardware accelerator, or specialized processor.

Moreover, in an aspect, network entity 20 may include RF front end 104 and transceiver 106 for receiving and transmitting radio transmissions, for example, wireless communications 26. For example, transceiver 106 may transmit or receive a signal that includes one or more SSs (e.g., DRS or PBCH). In some examples, the transceiver 106 may measure a received signal in order to determine signal quality and for providing feedback. For example, transceiver 106 may communicate with modem 108 to transmit messages generated by synchronization signal management component 40 and to receive messages and forward them to synchronization signal management component 40.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the synchronization signal management component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 and/or UE 14 may communicate with, for example, network entity 20. In an aspect, for example, modem 108 may configure transceiver 106 to operate at a specified frequency and power level based on the UE configuration of the UE 12 and/or UE 14 and communication protocol used by modem 108.

In an aspect, modem 108 may be a multiband-multimode modem, which can process digital data and communicate with transceiver 106 such that the digital data is sent and received using transceiver 106. In an aspect, modem 108 may be multiband and be configured to support multiple frequency bands for a specific communications protocol. In an aspect, modem 108 may be multimode and be configured to support multiple operating networks and communications protocols. In an aspect, modem 108 may control one or more components of the network entity 20 (e.g., RF front end 104, transceiver 106) to enable transmission and/or reception of signals based on a specified modem configuration. In an aspect, the modem configuration may be based on the mode of the modem and the frequency band in use. In another aspect, the modem configuration may include DMTC information associated with UE 12, UE 14 and/or the network entity 20 during cell selection and/or cell reselection.

The network entity 20 may further include memory 130, such as for storing data used herein and/or local versions of applications or synchronization signal management component 40 and/or one or more of its subcomponents being executed by processor 103. Memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining synchronization signal management component 40 and/or one or more of the sub-components of synchronization signal management component 40, and/or data associated therewith, when the network entity 20 is operating processor 103 to execute synchronization signal management component 40 and/or one or more of its sub-components. In another aspect, for example, memory 130 may be a non-transitory computer-readable storage medium.

Referring to FIG. 1B, similar to FIG. 1A, the UE 12 or UE 14 may include one or more processors 103 and a memory 130 that may operate in combination with a signal management component 50 to control a detecting component 52, a scheduling component 54, and/or a filler signal management component 56, for receiving SS (e.g., DRS) transmissions, management, and related operations as described herein.

In some aspects, the signal management component 50 and/or at least one subcomponent of the signal management component 50 may perform SS monitoring, reception, scheduling, decoding, and related operations. For example, the detecting component 52 may be configured to detect whether an SS or PBCH is received. In an aspect, the scheduling component 54 may be configured to identify the delay of receptions of one or more SSs (e.g., DRSs or PBCHs) in a shared spectrum. In some examples, the filler signal management component 56 may be configured to receive a filler signal before receiving one or more SSs (e.g., DRSs, or PBCH) from the network entity 20 in the shared spectrum.

In an aspect, the signal management component 50 may be communicatively coupled with a transceiver 106, which may include a receiver 32 for receiving and processing radio frequency (RF) signals (e.g., SS, DRS, or PBCH transmissions) and a transmitter 34 for processing and transmitting RF signals. The signal management component 50 may include the detecting component 52, the scheduling component 54, and/or the filler signal management component 56, for performing SS management and operations. The processor 103 may be coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, an RF receiver. In an aspect, the receiver 32 may receive signals transmitted by the network entity 20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, an RF transmitter.

In an aspect, the one or more processors 103 may include a modem 108 that uses one or more modem processors. The various functions related to the signal management component 50 may be included in modem 108 and/or processors 103 and, in an aspect, may be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the signal management component 50, including the detecting component 52, the scheduling component 54, and/or the filler signal management component 56.

The signal management component 50, the detecting component 52, the scheduling component 54, and/or the filler signal management component 56, may include hardware, firmware, and/or software code executable by a processor for performing detecting, scheduling, transmissions and related SS operations. For example, the hardware may include, for example, a hardware accelerator, or specialized processor.

Moreover, in an aspect, the UE 12 or UE 14 may include RF front end 104 and transceiver 106 for receiving and transmitting radio transmissions, for example, wireless communications 26. For example, transceiver 106 may transmit or receive a signal that includes one or more SSs (e.g., DRS or PBCH). In some examples, the transceiver 106 may measure a received signal in order to determine signal quality and for providing feedback. For example, transceiver 106 may communicate with modem 108 to transmit messages generated by the signal management component 50 and to receive messages and forward them to the signal management component 50.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the signal management component 50.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 and/or UE 14 may communicate with, for example, network entity 20. In an aspect, for example, modem 108 may configure transceiver 106 to operate at a specified frequency and power level based on the UE configuration of the UE 12 and/or UE 14 and communication protocol used by modem 108.

In an aspect, modem 108 may be a multiband-multimode modem, which can process digital data and communicate with transceiver 106 such that the digital data is sent and received using transceiver 106. In an aspect, modem 108 may be multiband and be configured to support multiple frequency bands for a specific communications protocol. In an aspect, modem 108 may be multimode and be configured to support multiple operating networks and communications protocols. In an aspect, modem 108 may control one or more components of the network entity 20 (e.g., RF front end 104, transceiver 106) to enable transmission and/or reception of signals based on a specified modem configuration. In an aspect, the modem configuration may be based on the mode of the modem and the frequency band in use. In another aspect, the modem configuration may include DMTC information associated with UE 12, UE 14 and/or the network entity 20 during cell selection and/or cell reselection.

The UE 12 or UE 14 may further include memory 130, such as for storing data used herein and/or local versions of applications or signal management component 50 and/or one or more of its subcomponents being executed by processor 103. Memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining the signal management component 50 and/or one or more of the sub-components of the signal management component 50, and/or data associated therewith, when the UE 12 or UE 14 is operating processor 103 to execute the signal management component 50 and/or one or more of its sub-components. In another aspect, for example, memory 130 may be a non-transitory computer-readable storage medium.

Figure 2:
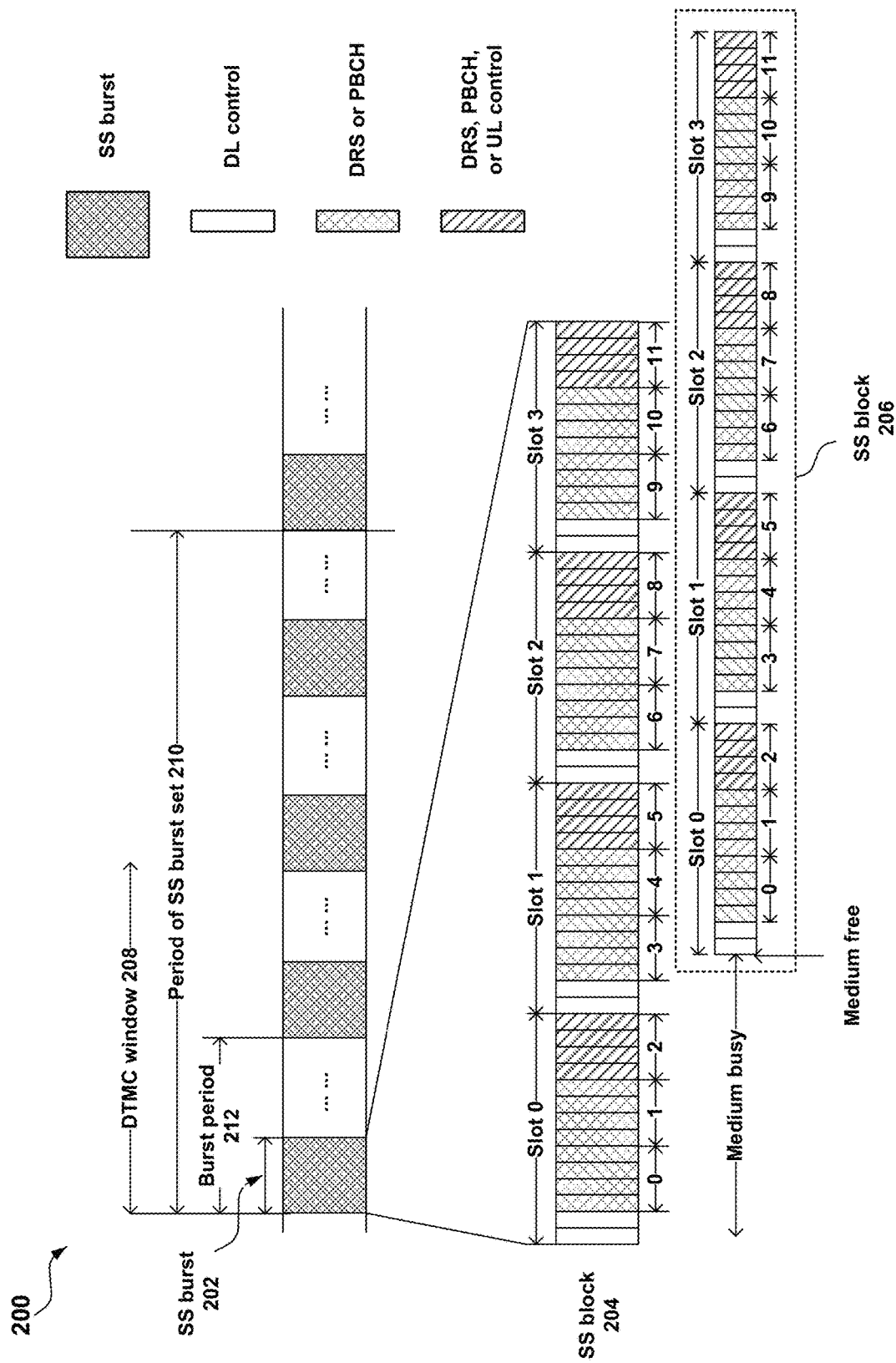
FIG. 2 illustrates an example frame structure using a first SS transmission scheme for a wireless communications system, according to one or more of the presently described aspects.

Referring to FIG. 2, in some implementations, an SS transmission scheme 200 may be used by a base station (e.g., the network entity 20 in FIG. 1) for transmitting one or more SSs (e.g., DRSs) and/or PBCHs. In an example, in a period of SS burst set 210 (e.g., 20 ms), a DTMC window 208 may be configured. In some cases, the SS burst set 210 may include a same beam or different beams for each SS burst, and the one or more beams may have same or different beam directions. In an aspect, during the DTMC window 208, at least an SS burst 202 (e.g., with 0.5 ms, or 1 ms duration) may be transmitted in a burst period 212 (e.g., 5 ms). In some examples, the SS burst 202 may include one or more slots (e.g., four (4) slots as shown: Slot 0, Slot 1, Slot 2, and Slot 3) in an SS block 204, and each slot may include fourteen (14) OFDM symbols (e.g., with tone spacing 15 kHz×$2^n$, where n=1, 2, 3, 4). For example, each OFDM symbol may have 120 kHz tone spacing (15 kHz×$2^3$=120 kHz). In an aspect, each slot in the SS block 204 may include downlink control information (e.g., in the first two (2) OFDM symbols of each slot), and three (3) SSs (e.g., DRSs and/or PBCHs) with four (4) OFDM symbols in each SS. In some cases, the last 4 OFDM symbols in each slot may be used for a DRS, a PBCH, or uplink control information.

In an aspect, when the base station (e.g., the network entity 20 in FIG. 1) detects that a medium in a shared spectrum is busy, the base station may delay a transmission of one or more SSs in the shared spectrum. For example, the base station may perform a CCA or an ECCA, and then start to transmit an SS block 206 immediately upon a determination that the previously busy medium is now free to use (e.g., the CCA or ECCA is successful). In some examples, the SS block 206 may include one or more SSs (e.g., DRSs) and/or one or more PBCHs. For example, the SS block 206 may include a predetermined number of SSs or DRSs, which may be less than the number of SSs or DRSs in the SS block 204. In some cases, the associated DRS or PBCH transmission may include an offset from the start of an OFDM symbol, a subframe, and/or the start of a DMTC window as if an initial or a previous CCA was successful (e.g., no offset because of the medium being free). In an aspect, the SS block 206 may be transmitted in a shared spectrum and/or an unlicensed spectrum.

Figure 3A:
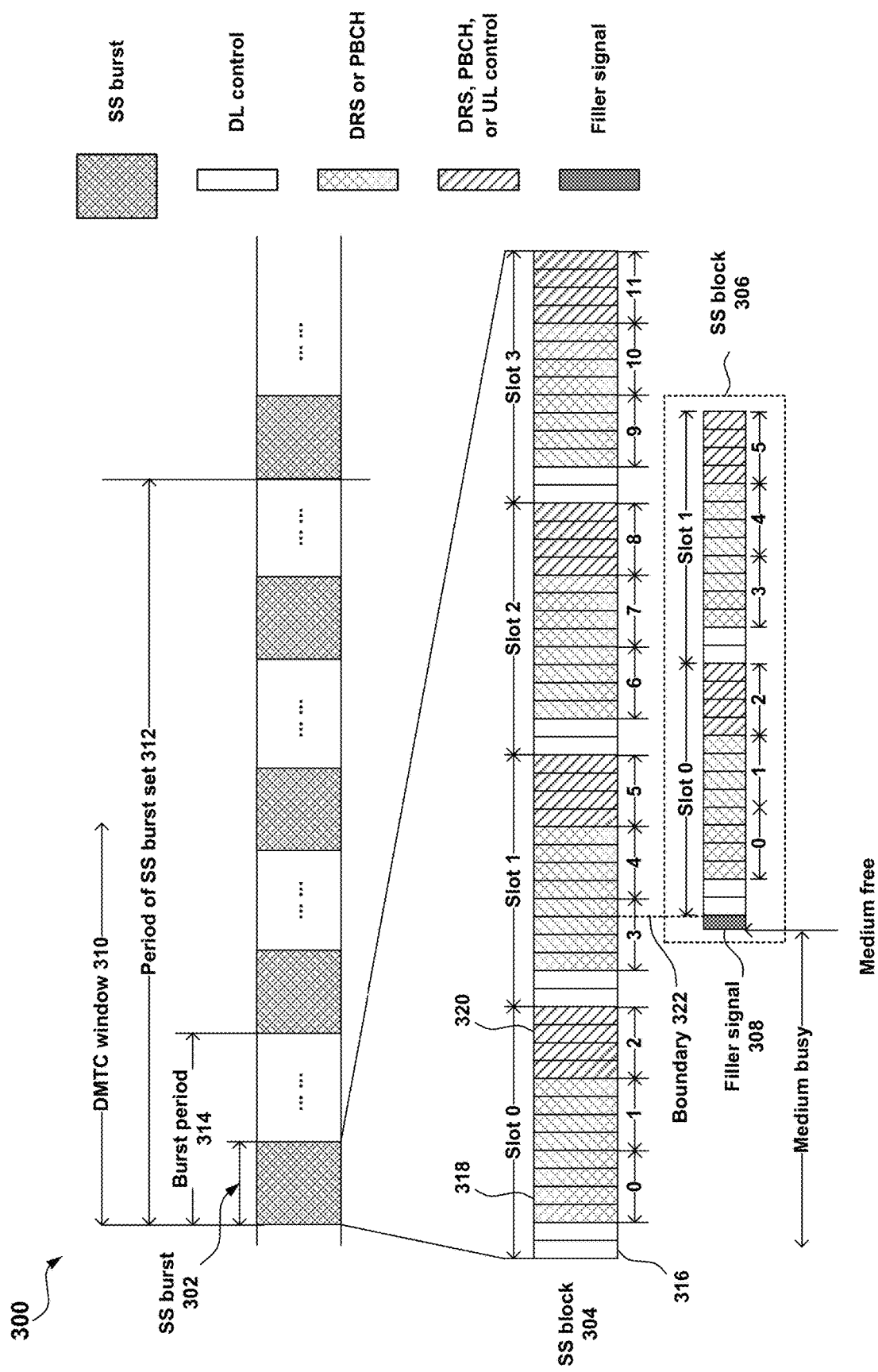
FIG. 3A illustrates an example frame structure using a second SS transmission scheme for a wireless communications system, according to one or more of the presently described aspects.

Referring to FIG. 3A, in an aspect, an SS transmission scheme 300 may be used by a base station (e.g., the network entity 20 in FIG. 1) for transmitting one or more SSs and/or PBCHs. In an example, similar to the SS transmission scheme 200 in FIG. 2, in a period of SS burst set 312 (e.g., 20 ms), a DTMC window 310 may be configured. In an aspect, during the DTMC window 310, at least an SS burst 302 (e.g., with 0.5 ms, or 1 ms duration) may be transmitted in a burst period 314 (e.g., 5 ms). In some examples, the SS burst 302 may include one or more slots (e.g., 4 slots as shown: Slot 0, Slot 1, Slot 2 and Slot 3) in an SS block 304, and each slot may include 14 OFDM symbols (e.g., with tone spacing 15 kHz×$2^n$, where n=1, 2, 3, 4). For example, each OFDM symbol may have 120 kHz tone spacing (15 kHz×$2^3$=120 kHz). In an aspect, each slot in the SS block 304 may include downlink (DL) control information (e.g., in the first two OFDM symbols 316 of each slot), and three SSs (e.g., OFDM symbols 318 for DRSs and/or PBCHs) with 4 OFDM symbols in each SS. In some cases, the last 4 OFDM symbols 320 in each slot may be used for a DRS, a PBCH, or uplink (UL) control information. In an example, the SS block 304 may be transmitted in a licensed spectrum or a shared spectrum.

In an aspect, similar to the SS transmission scheme 200 in FIG. 2, when the base station (e.g., the network entity 20 in FIG. 1) detects that a medium in a shared spectrum is busy, the base station may delay a transmission of one or more SSs and/or PBCHs in the shared spectrum. For example, the base station may perform a CCA or an ECCA, and then start to transmit an SS block 306 after a determination that the previously busy medium is now free to use (e.g., the CCA or ECCA is successful). In contrast to the SS transmission scheme 200 in FIG. 2, in an aspect, after the base station detects or determines that the medium is free (e.g., upon a successful CCA), the base station may start to transmit a filler signal 308 until an OFDM symbol boundary (e.g., an OFDM symbol boundary 322 in the SS block 304, which would be applied or observed as if a previously busy medium was free), and then transmit one or more SSs (e.g., DRSs) and/or PBCHs in the SS block 306 (e.g., including Slot 0 and Slot 1) after the filler signal 308. In some examples, the filler signal 308 may be included in the SS block 306, or may be transmitted separately and/or before transmitting the SS block 306. In some cases, the filler signal 308 may be a noise signal or a blank signal without any control information or data.

In some aspects, the associated PBCH transmission may include an offset from the start of a subframe that would be transmitted as if the previously busy medium was free, and/or start of the DMTC window 310 that would be used as if the previously busy medium was free. In an example, the SS block 306 is transmitted after the filler signal 308, which is at the OFDM symbol boundary 322 in the SS block 304. In some cases, one or more SS blocks (e.g., the SS block 306) may be transmitted in the shared spectrum until the end of the DTMC window 310, the end of the SS block 304, or a fixed or predetermined number of SSs (e.g., DRSs) or PBCHs being transmitted. For example, as shown in FIG. 3A, the SS block 306 may include six (6) SSs (e.g., DRSs or PBCHs) for transmission.

Figure 3B:
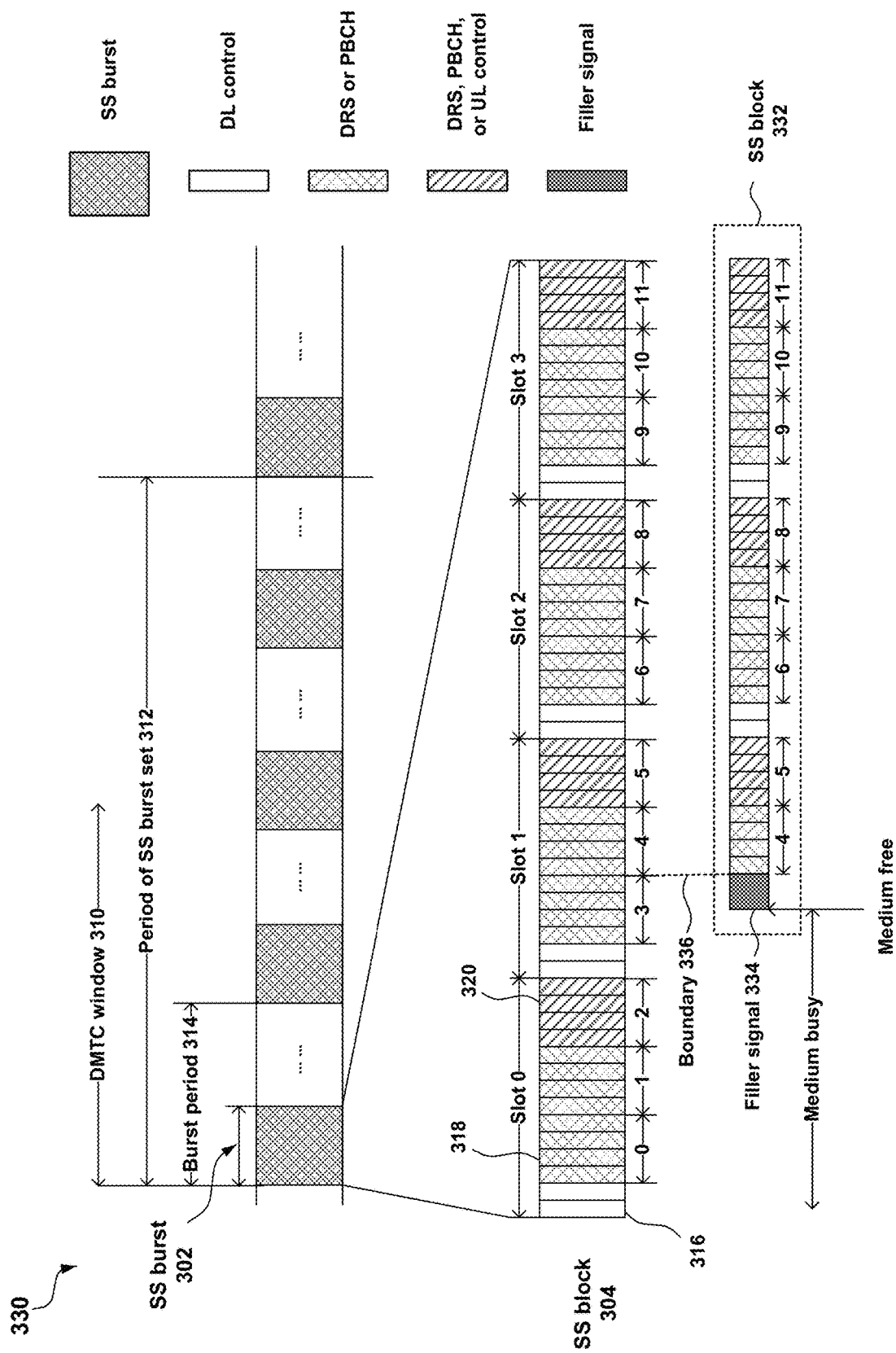
FIG. 3B illustrates an example frame structure using a third SS transmission scheme for a wireless communications system, according to one or more of the presently described aspects.

Referring to FIG. 3B, in an aspect, an SS transmission scheme 330 may be used by a base station (e.g., the network entity 20 in FIG. 1) for transmitting one or more SSs and/or PBCHs. In an example, similar to the SS transmission scheme 300 in FIG. 3A, during the DTMC window 310, the SS burst 302 (e.g., with 0.5 ms, or 1 ms duration) may be transmitted in the burst period 314 (e.g., 5 ms). In some examples, the SS burst 302 may include one or more slots (e.g., 4 slots as shown: Slot 0, Slot 1, Slot 2 and Slot 3) in the SS block 304, and each slot may include, for example, 14 OFDM symbols. In some examples, each OFDM symbol may have a tone spacing 15 kHz×$2^n$, where n=1, 2, 3, 4. For example, when n=3, an OFDM symbol may have a tone spacing that equals to 120 kHz (15 kHz×$2^3$=120 kHz). In an aspect, each slot in the SS block 304 may include downlink control information (e.g., in the first two OFDM symbols 316 of each slot), and three SSs (e.g., OFDM symbols 318 for DRSs and/or PBCHs) with 4 OFDM symbols in each SS. In some cases, the last 4 OFDM symbols 320 in each slot may be used for a DRS, a PBCH, or uplink control information. In an example, the SS block 304 may be transmitted in a licensed spectrum or a shared spectrum.

In an aspect, similar to the SS transmission scheme 300 in FIG. 3A, when the base station (e.g., the network entity 20 in FIG. 1) detects that a medium in a shared spectrum is busy, the base station may delay a transmission of one or more SSs in the shared spectrum or in an unlicensed spectrum. For example, the base station may perform a CCA or an ECCA, and then start to transmit an SS block 332 after a determination that the previously busy medium is free to use (e.g., the CCA or ECCA is successful). In an aspect, after the base station detects or determines that the medium is free (e.g., upon a successful CCA), to occupy the medium, the base station may start to transmit a filler signal 334 until an SS or PBCH boundary (e.g., an SS boundary 336 in the SS block 304, which would be applied or observed as if a previously busy medium was free), and then transmit one or more SSs (e.g., OFDM symbols 318 for DRSs or PBCHs) in the SS block 332 after the filler signal 334. In some examples, the filler signal 334 may be included in the SS block 332, or may be transmitted separately and/or before transmitting the SS block 332. In some cases, the filler signal 334 may be a noise signal or a blank signal without any control information or data.

Still referring to FIG. 3B, in an aspect, by aligning the timing with an SS boundary (e.g., an SS boundary 336) in the SS block 304, the SS transmission scheme 330 may maintain the transmission timing of the SS block 332 that would be used or observed in the SS block 304, as if the previously busy medium was free. In this case, the SS transmission scheme 330 may minimize the transmission of the filler signal 334 (e.g., the time duration of the filler signal 334) under the constraint that the transmission timing of the one or more SSs or PBCHs in the SS block 332 is unchanged (e.g., compared to the SS block 304). In addition, the transmission timing of the OFDM symbols within the SS block 332 is unchanged compared to the transmission timing in the SS block 304. In other words, each OFDM symbol in the SS block 332 would occur at the same time that would be used or observed in the SS block 304, as if the previously busy medium was free. In some aspects, after the filler signal 334 has been transmitted, one or more SS blocks (e.g., the SS block 332) may be transmitted in the shared spectrum until the end of DTMC window 310, the end of the SS block 304, or a fixed or predetermined number of SSs (e.g., DRSs) or PBCHs being transmitted.

In some examples, a user equipment (UE) may synchronize a serving cell and/or at least one neighboring cell via the SS block 332 when the SS boundary timing is aligned as discussed above. In some cases, the UE may not monitor the SS (e.g., DRS) or PBCH transmissions after the end of the DTMC window 310 or the end of the SS block 304. In some examples, due to an aperiodic nature when transmitting the SS block 332 (e.g., in a shared spectrum or an unlicensed spectrum), single shot detection may be used in the receiving side (e.g., a UE). In some cases, a periodic nature of the SS transmissions may be ensured in bands where CCA exempt transmissions are permitted.

Figure 3C:
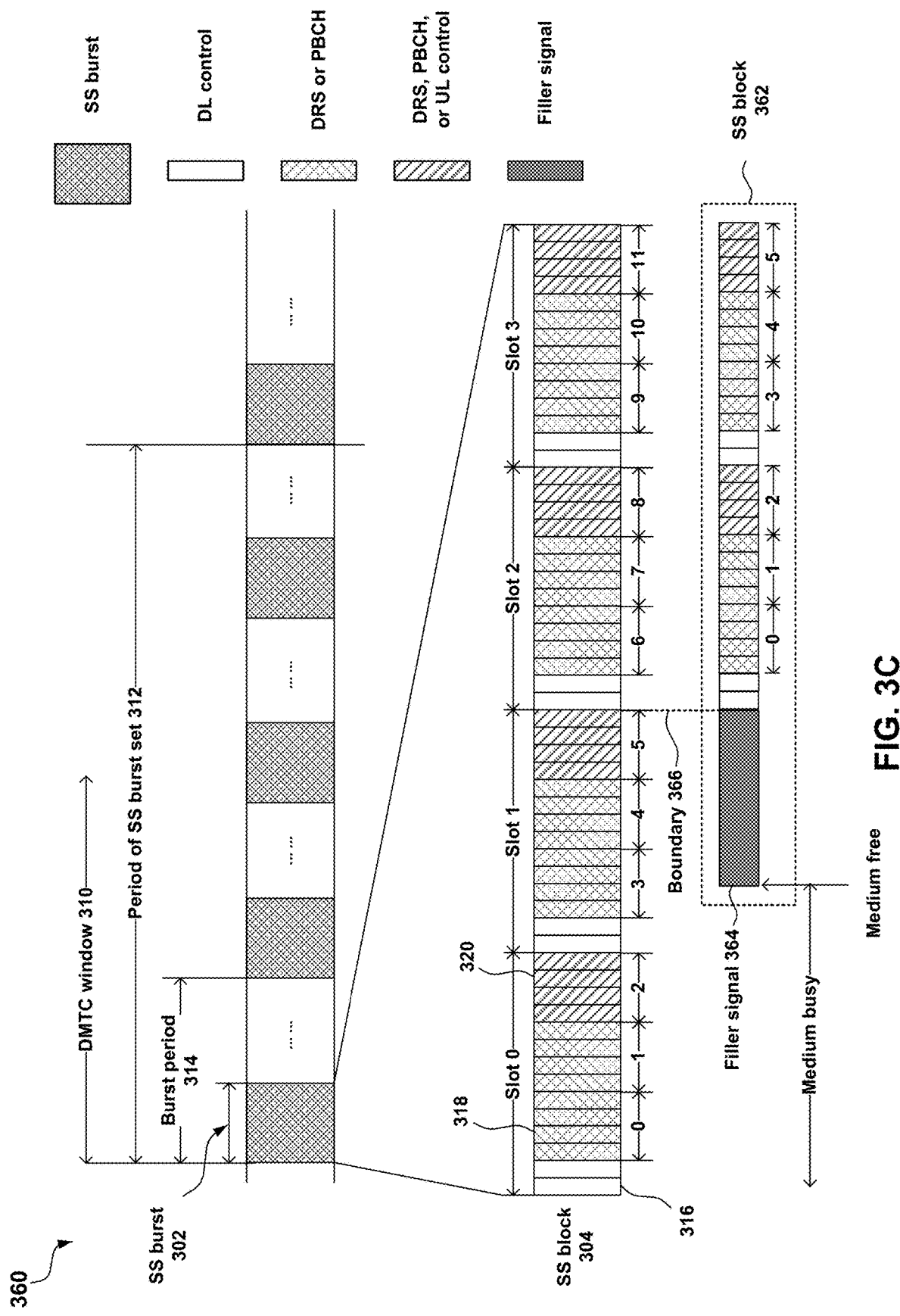
FIG. 3C illustrates an example frame structure using a fourth SS transmission scheme for a wireless communications system, according to one or more of the presently described aspects.

Referring to FIG. 3C, in an aspect, an SS transmission scheme 360 may be used by a base station (e.g., the network entity 20 in FIG. 1) for transmitting one or more SSs and/or PBCHs. In an example, similar to the SS transmission scheme 300 in FIG. 3A, during the DTMC window 310, the SS burst 302 (e.g., with 0.5 ms, or 1 ms duration) may be transmitted in the burst period 314 (e.g., 5 ms). In some examples, the SS burst 302 may include one or more slots (e.g., 4 slots as shown) in the SS block 304, and each slot may include, for example, 14 OFDM symbols (e.g., symbol 316). In an aspect, each slot in the SS block 304 may include downlink control information (e.g., in the first two OFDM symbols 316 of each slot), and three SSs (e.g., OFDM symbols 318 for DRSs and/or PBCHs) with 4 OFDM symbols in each SS. In some cases, the last 4 OFDM symbols 320 in each slot may be used for a DRS, a PBCH, or uplink control information. In an example, the SS block 304 may be transmitted in a licensed spectrum or a shared spectrum.

In an aspect, similar to the SS transmission scheme 300 in FIG. 3A, when the base station (e.g., the network entity 20 in FIG. 1) detects that a medium in a shared spectrum is busy, the base station may delay a transmission of one or more SSs and/or PBCHs in the shared spectrum. For example, the base station may perform a CCA or an ECCA, and then start to transmit an SS block 362 after a determination that the previously busy medium is free to use (e.g., the CCA or ECCA is successful). In an aspect, after the base station detects or determines that the medium is free (e.g., upon a successful CCA), the base station may start to transmit the filler signal 364 until a subframe boundary (e.g., a subframe boundary 366 in the SS block 304, which would be applied or observed as if a previously busy medium was free), and then transmit one or more SSs (e.g., DRSs) and/or PBCHs in the SS block 362 after the filler signal 364. In some examples, the filler signal 364 may be included in the SS block 362, or may be transmitted separately and/or before transmitting the SS block 362.

In some cases, the filler signal 364 may be a noise signal or a blank signal without any control information or data. In some examples, the associated PBCH transmission may include an offset from the start of the DMTC window 310 that would be used as if the previously busy medium was free.

Figure 4:
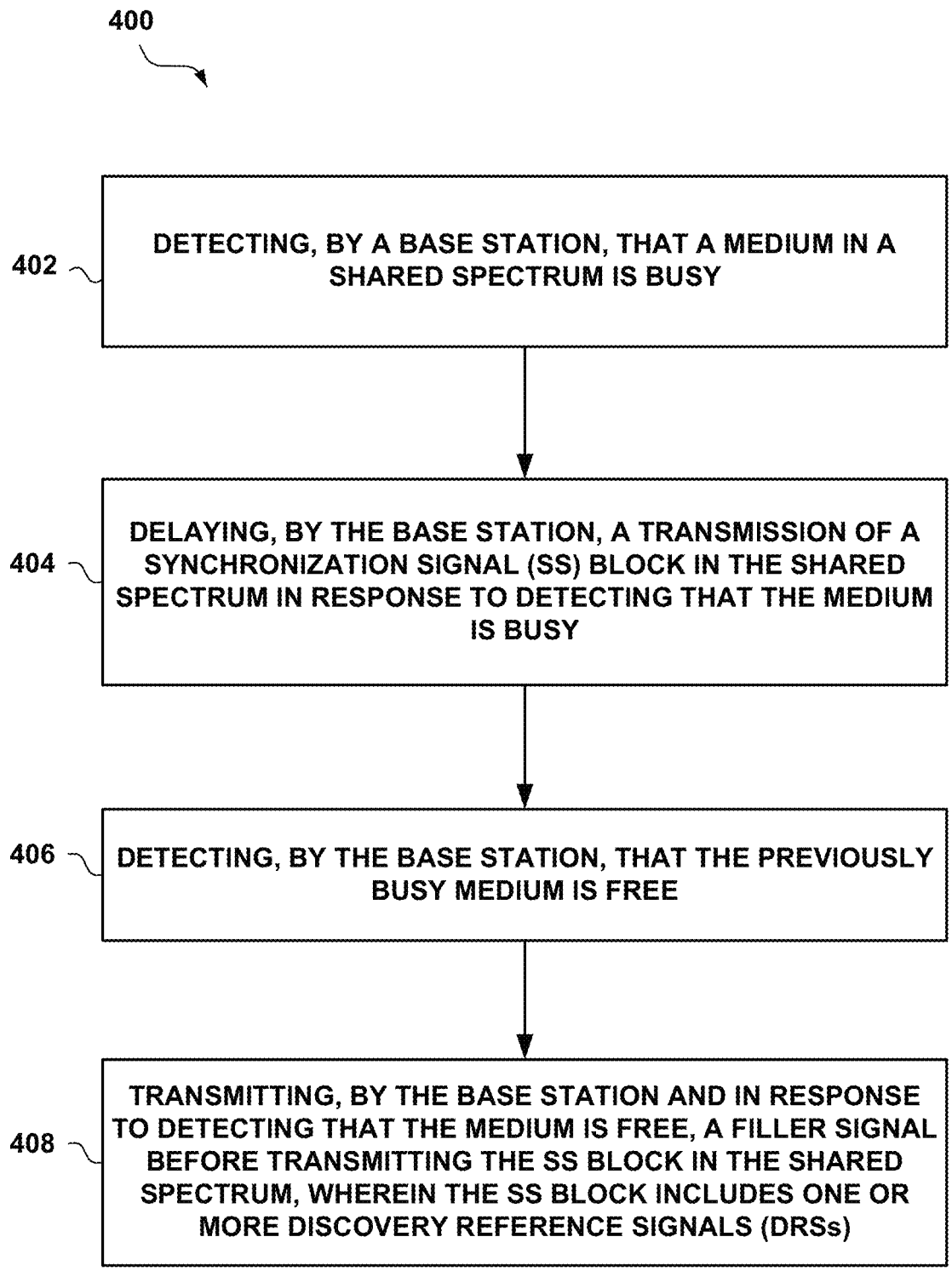
FIG. 4 is a flow chart of an example method of SS transmissions, according to one or more of the presently described aspects.

Referring to FIG. 4, in an operational aspect, the network entity 20 (FIG. 1) may perform one or more aspects of a method 400 for SS scheduling management and transmissions in a wireless communications system (e.g., a 5G NR system). For example, one or more of the processors 103, the memory 130, the modem 108, the transceiver 106, the synchronization signal management component 40, the detecting component 42, and/or the scheduling component 44, may be configured to perform aspects of the method 400.

In an aspect, at block 402, the method 400 may include detecting, by a base station, that a medium in a shared spectrum is busy. In an aspect, for example, the synchronization signal management component 40, and/or the detecting component 42, e.g., in conjunction with one or more of the processors 103, the memory 130, the modem 108, and/or the transceiver 106, may configure to detect whether a medium in a shared spectrum is busy or free. For example, the network entity 20 (e.g., via the synchronization signal management component 40, and/or the detecting component 42) may be configured to perform one or more CCAs or ECCAs to detect whether a medium in a shared spectrum or an unlicensed spectrum is busy or free.

In an aspect, at block 404, the method 400 may include delaying, by the base station, a transmission of an SS block in the shared spectrum in response to detecting that the medium is busy. In an aspect, for example, the synchronization signal management component 40, the detecting component 42, and/or the scheduling component 44, e.g., in conjunction with one or more of the processors 103, the memory 130, the modem 108, and/or the transceiver 106, may be configured to delay a transmission of an SS block in the shared spectrum in response to detecting that the medium is busy at block 402.

In an aspect, at block 406, the method 400 may include detecting, by the base station, that the previously busy medium is free. In an aspect, for example, the synchronization signal management component 40, and/or the detecting component 42, e.g., in conjunction with one or more of the processors 103, the memory 130, the modem 108, and/or the transceiver 106, may be configured to detect or determine whether the previously detected busy medium is free. In an example, the synchronization signal management component 40, and/or the detecting component 42 may be configured to detect or determine whether a CCA is performed successfully, and then the filler signal management component 46 may be configured to transmit the filler signal (at block 408 as discussed later) after a determination that the CCA is performed successfully.

In an aspect, at block 408, the method 400 may include transmitting, by the base station and in response to detecting that the medium is free, a filler signal before transmitting the SS block in the shared spectrum, and the SS block may include one or more DRSs. In an aspect, for example, the synchronization signal management component 40, the scheduling component 44, and/or the filler signal management component 46, e.g., in conjunction with one or more of the processors 103, the memory 130, the modem 108, and/or the transceiver 106, may be configured to transmit, via the transceiver 106, a filler signal before transmitting the SS block in the shared spectrum in response to detecting that the medium is free.

In an example, the filler signal management component 46, e.g., in conjunction with one or more of the processors 103, the memory 130, the modem 108, and/or the transceiver 106, may be configured to transmit, via the transceiver 106, the filler signal until a boundary of a DRS or a PBCH that would be transmitted as if the previously busy medium was free. In another example, the filler signal management component 46 may be configured transmit the filler signal until a boundary of an OFDM symbol or a boundary of a subframe that would be transmitted as if the previously busy medium was free.

In some examples, the SS block may include one or more DRSs or PBCHs. In some cases, the filler signal may be a noise signal, or a blank signal without any control information or data, and the noise signal may be used to occupy the medium. In some aspects, the timing of the filler signal may be aligned with a boundary that may be an OFDM symbol boundary, an SS or DRS boundary, or a subframe boundary.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to an LTE/LTE-A or a 5G NR communications system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
   detecting, by a base station, that a medium in a shared spectrum is busy;
   delaying, by the base station, a transmission of a synchronization signal (SS) block in the shared spectrum in response to detecting that the medium is busy;
   detecting, by the base station, that the previously busy medium is free; and
   transmitting, by the base station and in response to detecting that the medium is free, a filler signal before transmitting the SS block in the shared spectrum, wherein the SS block includes one or more discovery reference signals (DRSs) and the filler signal comprises a noise signal.

2. The method of claim 1, wherein transmitting the filler signal comprises transmitting the filler signal until a boundary of a DRS or a Physical Broadcast Channel (PBCH) that would be transmitted as if the previously busy medium was free.

3. The method of claim 1, wherein transmitting the filler signal comprises transmitting the filler signal until a boundary of an orthogonal frequency division multiplexing (OFDM) symbol that would be transmitted as if the previously busy medium was free.

4. The method of claim 1, wherein transmitting the filler signal comprises transmitting the filler signal until a boundary of a subframe that would be transmitted as if the previously busy medium was free.

5. The method of claim 1, further comprising:
   transmitting the one or more DRS or a PBCH in the SS block with an offset from the start of an OFDM symbol or a subframe that would be transmitted as if the previously busy medium was free, or an offset from the start of a discovery measurement timing configuration (DMTC) window that would be used as if the previously busy medium was free.

6. The method of claim 1, wherein the detecting comprises performing, by the base station, a clear channel assessment (CCA).

7. The method of claim 6, further comprising:
   determining, by the base station, whether the CCA is performed successfully, wherein transmitting the filler signal comprises transmitting the filler signal after a determination that the CCA is performed successfully.

8. The method of claim 1, wherein the transmission of the SS block is associated with at least a PBCH transmission.

9. The method of claim 1, wherein the filler signal and the SS block are transmitted during a DMTC window.

10. The method of claim 9, wherein the SS block is transmitted in the shared spectrum until the end of the DTMC window.

11. An apparatus for wireless communications, comprising:
   a transmitter;
   a memory configured to store instructions; and
   at least one processor communicatively coupled with the transmitter and the memory, wherein the at least one processor is configured to execute the instructions to:
      detect that a medium in a shared spectrum is busy;
      delay a transmission of a synchronization signal (SS) block in the shared spectrum in response to detecting that the medium is busy;
      detect that the previously busy medium is free; and
      transmit, via the transmitter and in response to detecting that the medium is free, a filler signal before transmitting the SS block in the shared spectrum, wherein the SS block includes one or more discovery reference signals (DRSs) and the filler signal comprises a noise signal.

12. The apparatus of claim 11, wherein the at least one processor is further configured to execute the instructions to transmit, via the transmitter, the filler signal until the boundary of a DRS or a Physical Broadcast Channel (PBCH) that would be transmitted as if the previously busy medium was free.

13. The apparatus of claim 11, wherein the at least one processor is further configured to execute the instructions to transmit, via the transmitter, the filler signal until the boundary of an orthogonal frequency division multiplexing (OFDM) symbol that would be transmitted as if the previously busy medium was free.

14. The apparatus of claim 11, wherein the at least one processor is further configured to execute the instructions to transmit, via the transmitter, the filler signal until the boundary of a subframe that would be transmitted as if the previously busy medium was free.

15. The apparatus of claim 11, wherein the at least one processor is further configured to execute the instructions to transmit, via the transmitter, the one or more DRSs or a PBCH in the SS block with an offset from the start of an OFDM symbol or a subframe that would be transmitted as if the previously busy medium was free, or an offset from the start of a discovery measurement timing configuration (DMTC) window that would be used as if the previously busy medium was free.

16. The apparatus of claim 11, wherein the at least one processor is further configured to execute the instructions to perform a clear channel assessment (CCA).

17. The apparatus of claim 16, wherein the at least one processor is further configured to execute the instructions to:
determine whether the CCA is performed successfully; and
transmit, via the transmitter, the filler signal after a determination that the CCA is performed successfully.

18. The apparatus of claim 11, wherein the transmission of the SS block is associated with at least a PBCH transmission.

19. The apparatus of claim 11, wherein the at least one processor is further configured to execute the instructions to transmit, via the transmitter, the filler signal and the SS block during a DMTC window.

20. The apparatus of claim 19, wherein the at least one processor is further configured to execute the instructions to transmit, via the transmitter, the SS block in the shared spectrum until the end of the DTMC window.

21. An apparatus for wireless communications, comprising:
means for detecting that a medium in a shared spectrum is busy;
means for delaying a transmission of a synchronization signal (SS) block in the shared spectrum in response to detecting that the medium is busy;
means for detecting that the previously busy medium is free; and
means for transmitting, in response to detecting that the medium is free, a filler signal before transmitting the SS block in the shared spectrum, wherein the SS block includes one or more discovery reference signals (DRSs) and the filler signal comprises a noise signal.

22. The apparatus of claim 21, wherein the means for transmitting the filler signal comprises means for transmitting the filler signal until the boundary of a DRS or a Physical Broadcast Channel (PBCH) that would be transmitted as if the previously busy medium was free.

23. The apparatus of claim 21, wherein the means for transmitting the filler signal comprises means for transmitting the filler signal until the boundary of an orthogonal frequency division multiplexing (OFDM) symbol that would be transmitted as if the previously busy medium was free.

24. The apparatus of claim 21, wherein the means for transmitting the filler signal comprises means for transmitting the filler signal until the boundary of a subframe that would be transmitted as if the previously busy medium was free.

25. A non-transitory computer-readable medium storing code executable by at least one processor, comprising:
code to detect that a medium in a shared spectrum is busy;
code to delay a transmission of a synchronization signal (SS) block in the shared spectrum in response to detecting that the medium is busy;
code to detect that the previously busy medium is free; and
code to transmit, in response to detecting that the medium is free, a filler signal before transmitting the SS block in the shared spectrum, wherein the SS block includes one or more discovery reference signals (DRSs) and the filler signal comprises a noise signal.

26. The non-transitory computer-readable medium of claim 25, further comprising code to transmit the filler signal until the boundary of a DRS or a Physical Broadcast Channel (PBCH) that would be transmitted as if the previously busy medium was free.

27. The non-transitory computer-readable medium of claim 25, further comprising code to transmit the filler signal until the boundary of an orthogonal frequency division multiplexing (OFDM) symbol that would be transmitted as if the previously busy medium was free.

28. The non-transitory computer-readable medium of claim 25, further comprising code to transmit the filler signal until the boundary of a subframe that would be transmitted as if the previously busy medium was free.

* * * * *